United States Patent Office 2,740,793
Patented Apr. 3, 1956

2,740,793
PYRAZOLINES

John David Kendall and George Frank Duffin, Ilford, England, assignors to Ilford Limited, Ilford, England, a British company No Drawing. Application August 18, 1952,
Serial No. 305,084

Claims priority, application Great Britain
September 7, 1951

6 Claims. (Cl. 260—310)

This application is a continuation-in-part of application Serial No. 165,117, Patent No. 2,610,969, filed May 29, 1950.

This invention relates to a process for the improvement of natural or synthetic fibrous materials and of films of natural or synthetic colloid materials. Within these terms are to be understood textile materials generally, in the form of filaments, threads, yarns, woven or knitted fabrics, made of cotton, silk, wool, hemp or flax, or of synthetic materials such as regenerated cellulose, cellulose nitrate, cellulose acetate, cellulose propionate, cellulose butyrate and mixed cellulose esters as, for instance, cellulose acetate-butyrate and cellulose acetate-propionate, nylon and similar synthetic linear polyamides, vinyl derivatives such as vinyl esters, acetals, chlorides and other polymeric colloid materials including mixed polymers and inter-polymers of vinyl derivatives. Also included are natural fibrous materials such as wood pulp and synthetic fibrous materials made of any of the foregoing types of synthetic compound not in textile form. The terms also include sheet materials formed from any of the foregoing synthetic materials, e. g. films of cellulose acetate, cellulose nitrate, cellulose acetate-butyrate and the like, or formed from compacted fibres, e. g. paper, cardboard, felt and the like, or from natural colloids such as gelatin.

The foregoing materials and materials of similar character are hereinafter referred to for brevity as "fibres and films."

According to the present invention a process for improving fibres and films comprises applying thereto a small quantity of a fluorescent compound of the general formula:

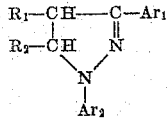

wherein $R_1$ is a hydrocarbon or substituted hydrocarbon group, $R_2$ is a hydrogen atom, hydrocarbon group or substituted hydrocarbon group, $Ar_1$ is an aromatic residue, e. g. phenyl or naphthyl, which may contain any of the substituents hydroxy, alkoxy, hydroxyalkyl, amino, hydrocarbon-substituted-amino or acylamino groups or halogen atoms and $Ar_2$ is an aromatic nucleus which may contain any substituent groups, e. g. substituent hydrocarbon, hydroxy, alkoxy, hydroxyalkyl, amino, hydrocarbon-substituted-amino, acylamino, sulphonic, carboxylic, or cyano groups, which compound is colourless in aqueous or ethyl alcoholic solution. $R_1$ or $R_2$ may be, for example, alkyl, aryl or aralkyl groups, such as methyl, ethyl, propyl, butyl, phenyl, naphthyl and benzyl. By the term "colourless in aqueous or ethyl alcoholic solution" is meant that a solution of the compound in water or ethyl alcohol has an absorption maximum not greater than 4000 A. The preferred compounds are those in which the absorption maximum does not exceed 3900 A.

The foregoing definition of the compounds does not include compounds in which $R_1$, $R_2$, $Ar_1$ or $Ar_2$ contains a nitro substituent.

A process for improving fibres and films is described in U. S. application Serial No. 165,116, now Patent No. 2,639,990 of May 26, 1953, and consists in applying thereto a small quantity of a fluorescent compound of the general formula given above where $R_1$ is a hydrogen atom. The present invention is a development of this earlier invention in which the compound used is of the same general character but one or both of the hydrogen atoms in the 4-position of the pyrazoline ring are replaced by hydrocarbon or substituted hydrocarbon groups.

The compounds can be prepared by methods analogous to those described in U. S. applications Serial Nos. 165,116 and 165,117. The following are examples of their preparation:

EXAMPLE I

4-methyl-1:3-diphenylpyrazoline

Propiophenone (13.4 g.), dimethylamine hydrochloride (8.15 g.) and paraformaldehyde (5.0 g.) were dissolved in ethanol (20 cc.), one drop of concentrated hydrochloric acid added and the solution was boiled for 16 hours under reflux. The ethanol was then distilled off when the residue set to a white crystalline mass. This was treated with 10% aqueous sodium carbonate (190 cc.) and phenylhydrazine (9 cc.) added. After heating for 6 hours at 100° the mixture was cooled and the aqueous layer decanted from the semi-solid mass which had precipitated. This was washed with water and then treated with methanol (20 cc.) when it became crystalline. After filtration the solid was washed with methanol and recrystallised from methanol to give fine white plates, M. Pt. 119°.

EXAMPLE II

4-methyl-3-phenyl-1-p-sulphophenylpyrazoline
(sodium salt)

Propiophenone (6.7 g.), dimethylamine hydrochloride (4.1 g.) and paraformaldehyde (2.5 g.) were dissolved in ethanol (10 cc.) and one drop of concentrated hydrochloric acid added. The solution was boiled under reflux for 16 hours and the ethanol removed by distillation. The residue set to a white crystalline mass which was dissolved in 10% aqueous sodium carbonate (65 cc.) and phenylhydrazine p-sulphonic acid (9.5 g.) added. After heating at 100° for 60 hours the solution was cooled, ether extracted and the filtered aqueous layer diluted with a saturated salt solution (50 cc.) when a copious yellow crystalline precipitate was obtained. After filtration, washing with brine, ethanol and ether and drying, the sodium salt of 4-methyl-3-phenyl-1-p-sulphophenylpyrazoline was obtained as very pale yellow plates.

EXAMPLE III

4-methyl-3:5-diphenyl-1-p-sulphophenylpyrazoline
(sodium salt)

Alpha-benzalpropiophenone (11.1 g.) (prepared by the method of R. D. Abell, J. Chem. Soc. 79 (1901) 928) was added to a solution of phenylhydrazine-p-sulphonic acid (9.5 g.) in water (100 cc.) containing concentrated sulphuric acid (2.6 cc.). The resulting mixture was boiled under reflux for 16 hours, cooled, diluted with water (200 cc.) and 40% aqueous sodium hydroxide (20 cc.) added. The crystalline precipitate which immediately formed was filtered, washed with brine, ethanol and ether and dried to give 4-methyl-3:5-diphenyl-1-p- sulphophenylpyrazoline (sodium salt) as colourless plates.

EXAMPLE IV

1:3:4-triphenylpyrazoline

Desoxybenzoin (4.9 g.), paraformaldehyde (0.75 g.) and dimethylamine hydrochloride (2 g.) were dissolved in ethanol (10 cc.) and one drop of concentrated hydrochloric acid. After refluxing for one hour more paraformaldehyde (0.75 g.) was added and the boiling continued for a further 20 hours. A solution of phenylhydrazine (2.45 cc.) in 3% aqueous sodium carbonate (80 cc.) was then added and the mixture heated on the steam bath for 20 hours. The aqueous solution was then decanted from the semi-solid mass which had precipitated. After washing with more water the precipitated mass was lixiviated with ethanol when it crystallised. Filtration and further washing with ethanol left small white needles of 1:3:4-triphenylpyrazoline, M. Pt. 210–211°.

EXAMPLE V

3-p-chlorophenyl-4-methyl-1-phenylpyrazoline p-Chloropropiophenone (3.8 g.), dimethylamine hydrochloride (1.85 g.) and paraformaldehyde (1.12 g.) were dissolved in ethanol (13 cc.), a few drops of concentrated hydrochloric acid added and the solution refluxed for 16 hours. After evaporation under reduced pressure the solid residue was dissolved in ethanol (12 cc.), phenylhydrazine (3.5 cc.) and 20% aqueous sodium hydroxide (6 cc.) added and the resulting solution refluxed for three hours. On cooling an oily solid was precipitated which solidified on lixiviation with methanol. Recrystallisation from methanol yielded pale yellow needles of 3-p-chlorophenyl-4-methyl-1-phenylpyrazoline, M. Pt. 138°.

EXAMPLE VI

4-benzyl-1:3-diphenylpyrazoline

β-Phenylpropiophenone (7.0 g.), dimethylamine hydrochloride (2.7 g.) and paraformaldehyde (1.75 g.) were dissolved in ethanol (20 cc.), a few drops of concentrated hydrochloric acid added and the solution refluxed for 8 hours. After evaporation under reduced pressure the solid residue was treated with 4% aqueous sodium hydroxide (35 cc.), phenylhydrazine (4 cc.) and ethanol (35 cc.) and refluxed for 6 hours. On cooling an oil was precipitated which solidified on lixiviation with methanol. Recrystallisation from methanol yielded colourless leaflets, M. Pt. 136–7°, of 4-benzyl-1:3-diphenylpyrazoline.

EXAMPLE VII

1:3-diphenyl-4-ethylpyrazoline n-Butyrophenone (14.8 g.), dimethylamine hydrochloride (8.15 g.) and paraformaldehyde (5.0 g.) were dissolved in ethanol (30 cc.), a few drops of concentrated hydrochloric acid added and the solution refluxed for 9 hours. After evaporation under reduced pressure, the solid residue was dissolved in ethanol (45 cc.), phenylhydrazine (13 cc.) and 4% aqueous sodium hydroxide (125 cc.) added, and the solution refluxed for 6 hours. On cooling and diluting with water an oil was precipitated which was lixiviated with aqueous methanol to give a fine crystalline mass. Recrystallisation from methanol yielded 1:3-diphenyl-4-ethylpyrazoline as fine pale yellow needles, M. Pt. 90°.

Compounds of the foregoing general formula which are colourless, white or pale yellow have been found to possess a strong bluish fluorescence in daylight and a slightly less fluorescence in incandescent electric or similar light, and on application to fibres and films they impart such fluorescence to them. The effect of applying these compounds to fibres and films is to impart a degree of brilliance to them which is attractive and useful. Applied to materials which are allegedly white, but of which the whiteness has a slight tinge of yellow or brown, the compounds serve to "kill" the yellow or brown tinge so that the apparent whiteness of the materials is very appreciably enhanced. This application of the materials is of especial importance, and the present invention is therefore particularly concerned with the application of the compounds to such "off-white" fibres and films. It is a special advantage of the compounds of this invention, and especially those in which $R_2$ or $Ar_2$ contain a sulphonic group, that impart a very desirable whiteness to wool fibers, the effect being a strong resistance to fading under the action of light and a strong resistance to laundering.

Applied to dyed textile materials the compounds have the effect of improving the apparent purity of the colour.

Very small quantities of the compounds are sufficient to achieve the desired improvement in the materials. Thus the whiteness of textile materials, paper and the like can be very considerably enhanced by treating the materials with a solution of one of the said compounds, in water or an organic solvent, e. g. at a solution concentration of 1 part in 5000 to 1 part in 100,000. Applied to wool, the compounds in which $R_2$ or $Ar_2$ contains a sulphonic acid group may be used from weakly acid solution or even neutral solution and are substantive to wool from such solutions. The conditions should be chosen so that the fibres or films absorb 0.01 to 1.0% by weight of the fluorescent compound.

In the case of fibres or films which are not in their natural state, the compounds of this invention may be applied thereto at any stage in the manufacture of such materials. Thus in the production of artificial filaments, fibres or films by the extrusion or casting of colloid compositions, the compounds of this invention may be incorporated in such compositions before extrusion or casting so that they are uniformly dispersed throughout the products.

Alternatively the preferred fibres or films may be treated with solutions of the compounds. Thus in the treatment of textile materials the compounds may be included in any of the liquids commonly employed for dyeing, scouring, dressing and the like, and this invention includes compositions for application to textiles for such purposes which include a compound of the foregoing formula in conjunction with a textile dye, detergent or other material used for treating textiles. The compounds may be applied to the materials after the normal processes of their manufacture have been completed, for example by including the compounds in domestic washing preparations.

In the case of paper and similar materials the compounds may be applied to the wood pulp or rag-fibre before such material is made into paper, or during the paper-making operation, or may be applied as a solution directly to the raw paper, or may be applied in a dressing composition, e. g. a baryta coating, applied to the paper.

The compounds referred to above in which neither $R_2$ nor $Ar_2$ contains a sulphonic or carboxylic group fluoresce strongly in organic solvents and may be applied to protein and polyamide fibres from an organic solvent or aqueous organic solvent, e. g. aqueous ethyl alcohol or aqueous acetic acid. These compounds, by reason of their solubility in organic solvents, are also especially adapted for inclusion in solutions of cellulose acetate and similar materials which are to be extruded or cast to form fibres or films.

One important application of the invention is in the treatment of photographic prints where application of a solution of a compound of the foregoing general formula has the effect of whitening the high-lights of the print. Considerable effort has hitherto been directed to the production of prints having brilliant highlights, and the present invention provides a simple method whereby this result may be achieved. However, the compounds may, if desired, be incorporated in the photographic emulsion, or sub-coat or supercoat layers, prior to coating such layers to form the photographic element.

In the case of prints made on paper carrying silver bromide emulsions, the prints normally have a "warm" tone, but by treatment with a compound according to this invention the tone may be changed to resemble very closely the cold tone commonly associated with prints made on paper coated with silver chloride emulsions.

The compounds of this invention may also be applied to films coated on supports, for example to finished photographic films or plates where the gelatin film takes up the compound and is thereby caused to fluoresce and the photographic image to appear colder in tone.

What we claim is:

1. A white fluorescent compound of the general formula:

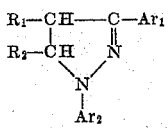

where $R_1$ is a group selected from the class consisting of methyl, ethyl, phenyl and benzyl, $R_2$ is selected from the class consisting of the hydrogen atom and the phenyl group, $Ar_1$ is selected from the class consisting of phenyl and chlorophenyl groups, and $Ar_2$ is selected from the class consisting of phenyl and sulphophenyl groups.

2. The compound 4-methyl-3-phenyl-1-p-sulphophenyl pyrazoline.
3. The compound 4-methyl-3:5-diphenyl-1-p-sulphophenyl pyrazoline.
4. The compound 4-methyl-1:3-diphenyl pyrazoline.
5. The compound 4-methyl-3-p-chlorphenyl-1-phenyl pyrazoline.
6. The compound 4-ethyl-1:3-diphenyl pyrazoline.

References Cited in the file of this patent

UNITED STATES PATENTS

| | | |
|---|---|---|
| 2,508,617 | Mastin | May 23, 1950 |
| 2,610,969 | Kendall et al. | Sept. 16, 1952 |
| 2,700,053 | Wirth | Jan. 18, 1955 |

FOREIGN PATENTS

| | | |
|---|---|---|
| 878,823 | France | Nov. 2, 1942 |
| 498,125 | Belgium | Sept. 30, 1950 |

OTHER REFERENCES

Beilstein: Vierte Auflage, vol. 23, pages 153, 154, and 168.